Dec. 7, 1965   H. S. SAUNDERS ETAL   3,222,219
CERAMIC-COATED ELECTRICALLY-CONDUCTIVE WIRE
AND METHOD OF MAKING SAME
Filed Nov. 29, 1961
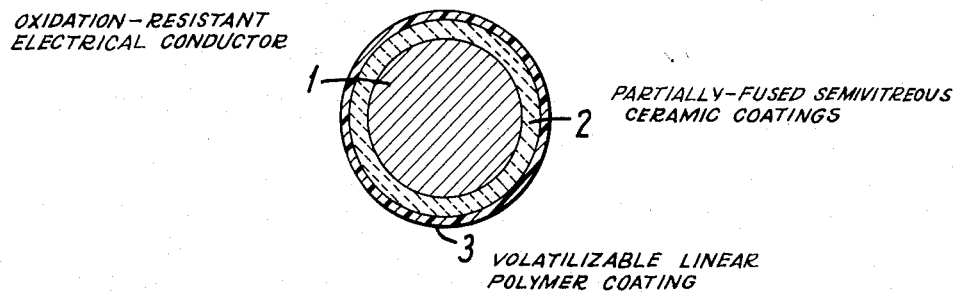
OXIDATION-RESISTANT
ELECTRICAL CONDUCTOR
PARTIALLY-FUSED SEMIVITREOUS
CERAMIC COATINGS
VOLATILIZABLE LINEAR
POLYMER COATING
INVENTORS.
HOLLIS S. SAUNDERS
ROBERT W. GEHRING
BY
ATTORNEYS.

3,222,219
CERAMIC-COATED ELECTRICALLY-CONDUCTIVE WIRE AND METHOD OF MAKING SAME

Hollis S. Saunders, Fort Wayne, and Robert W. Gehring, Grabill, Ind., assignors to Phelps Dodge Copper Products Corporation, New York, N.Y., a corporation of Delaware
Filed Nov. 29, 1961, Ser. No. 155,684
11 Claims. (Cl. 117—218)

This invention relates to insulated electrically-conductive wire of the ceramic-coated type and more particularly to an improved wire of this type and a novel method of making the same.

The present invention is applicable to lead wire, resistance wire, magnet wire, and the like, but for the purpose of illustration will be described in connection with magnet wire.

Magnet wire must be insulated adequately to prevent shorting between adjacent turns of the wire and also to prevent electrical contact between the wire and any adjacent conductive part, such as a magnetic core on which the wire is placed. Moreover, since space is usually an important factor in electrical equipment, the insulation of the magnet wire should occupy as little space as possible. At the same time, the insulation should have good dielectric strength in view of the high voltages often applied across such wires. A further factor is the extent to which the magnet wire is "worked" after the insulation has been applied. For example, winding the wire into a coil will often impose considerable stress on the insulation and tend to abrade and crack it and also to pull it away from the wire. Still another factor is that the electrical apparatus into which the wire is assembled may be subjected to temperature extremes, both high and low, which the wire insulation must be capable of withstanding.

In other words, the magnet wire insulation should have high degrees of flexibility and toughness, strong adhesion to the wire even when the wire is bent considerably, high dielectric strength, the qualities of hardness and resistance to abrasion, and the ability to withstand temperature extremes.

It is well known that ceramic or refractory dielectric materials, as commonly applied to magnet wire, give excellent dielectric properties but have poor flexibility and poor adhesion to the wire. As a result, these materials have resulted in breakage or weakening of the dielectric coating in the normal use of the magnet wire.

Attempts have been made to overcome these disadvantages in mechanical properties of ceramic insulation for wire, as by combining the ceramic or refractory coating with an outer coating of a resinous material. It has also been proposed to improve the mechanical properties of ceramic-coated wire by coating the wire with a liquid suspension of a composition consisting of a frit of refractory material (such as a mixture of zinc, cobalt and silicon oxides) in a minor proportion and a major proportion of a flux comprising a mixture of lead borate and lead borosilicate; and then fire the coated suspension under such time and temperature conditions that the coating is completely fused on the wrie. By such complete fusion, the final coating is in a glassy phase, except possibly for slight crystallization at the surface. Thus, according to Fraher Patent No. 2,907,-665, dated October 6, 1959, the coated suspension is fired at a temperature of 1100° F. to 1350° F. for a period of about 20 minutes; and even such slight crystallization at the surface which would result from incorporating titanium dioxide into the coating was considered undesirable.

Insofar as we are aware, the various prior proposals for improving ceramic-coated wire have not overcome satisfactorily the problems of poor flexibility and poor adhesion encountered with such wire.

The principal object of the present invention is to provide a magnet wire insulated by a ceramic coating which retains essentially all the desired properties of such coatings but has substantially greater flexibility and adhesion to the wire than has been attained heretofore with such coatings.

We have discovered that a ceramic-coated magnet wire of exceptional flexibility can be obtained by providing the wire with semi-vitreous ceramic coatings separately fired on the conductor and containing in their final condition substantial proportions of both glassy and crystalline phases. More particularly, a magnet wire made according to the invention comprises an elongated oxidation-resistant electrical conductor, and multiple ceramic coatings fired separately in place on the conductor and each consisting essentially of substantial proportions of both glassy and crystalline phases which are the product of partial fusion of a mixture of (a) a frit selected from the group consisting of lead borate, lead silico-borate, lead silicate, barium boro-silicate, barium-alumino-silico-borate, and mixtures thereof, and (b) a refractory dielectric material, the latter constituting a minor part but at least 5 parts (by weight) of the mixture of (a) and (b). When the components of this mixture are fused together on the conductor, the refractory material has a limited solubility in the glassy phase formed from the melted frit, so that only part of the refractory material is dissolved. Thus, as a result of the remaining undissolved refractory material, the final coating or ceramic system has a substantial crystalline phase dispersed through the glassy phase as evidenced by the X-ray diffraction pattern of the fired coating.

As will be understood by those skilled in the art, the frit is obtained by melting one of the borates or silicates selected from the above-mentioned group, or a combination of them, to form molten glass which is then suddenly cooled (as by quenching in water or between water-cooled rolls) to form glass made up of small friable particles. The frit should be essentially alkali-free to retain fully its excellent electrical insulating property.

The refractory dielectric material may be any of the commonly known ones, such as chromium oxide, boron nitride, titanium dioxide, zirconium dioxide, silicon dioxide, nickel oxide, mica (either natural or man-made), aluminum oxide, alumina-silicate, and other similar refractory compounds or mixtures thereof.

The excellent adhesion of this ceramic coating to the metal substrate is obtained through the solution of the metal oxide, formed in the initial stages of curing, by the glassy phase, to form a staturated interfacial layer of this metal oxide in the glassy phase at the metal-ceramic interface. The superior flexibility of this system is obtained by the combination of the glassy and crystalline phases of the coating. This flexibility is considerably less if the combination of the frit and refractory material does not form separate glassy and crystalline phases, that is, if the refractory material is completely dissolved by the glassy phase to form a vitreous or glassy system. If the content of the refractory material in the frit-refractory mixture is less than the aforesaid minimum of 5%, the desired flexibility is not attained; and if this content is over 30%, the desired strong adhesion of the ceramic to the wire is not attained.

For best results, each coating of the partially fused mixture should have a thickness of 0.05 to 0.25 mil. Also, the preferred embodiment of the new wire comprises a layer of a linear thermoplastic polymer coated on the outermost ceramic coating and which is volatilizable to form a substantially non-carbonaceous residue. This superimposed layer is preferably a linear polymer which is essentially the reaction product of a dihydric alcohol and an aromatic dicarboxylic acid, such as "Dacron" or "Mylar."

According to the method of the present invention, the oxidation-resistant conductive wire is passed through a ceramic slip consisting essentially of a clay and water suspension of the aforementioned mixture of the refractory dielectric material and the frit or frits selected from the previously mentioned group. The slip-coated wire is then heated in an oxidizing atmosphere to a temperature and for a period of time sufficient only to melt the frit and partially dissolve the refractory material in the melted frit, this heating being effected preferably to a temperature of 1300° F. to 1950° F. for a period of 25 to 180 seconds by passing the coated wire continuously through a heating zone in an oven. This leaves a substantial portion of undissolved refractory material dispersed as a crystalline phase through a glassy phase formed from the melted frit and dissolved refractory material. After cooling of the partially fused coating on the wire, the coating and heating steps are repeated to provide at least one additional ceramic coating partially fused on the first coating, this procedure being preferably repeated until the coatings have a total thickness of 0.15–0.5 mil.

Preferably, the wire is then passed through a solution of the aforementioned linear thermoplastic polymer to apply the solution as an overcoating on the final ceramic coating. The overcoated wire is then heated sufficiently to substantially remove the solvent from the polymer solution but insufficiently to volatilize the polymer, thus forming on the ceramic coating a thin uniform and continuous layer of the linear thermoplastic polymer as a lubricating film for protecting the underlying ceramic coating during use of the magnet wire in a winding or coil-making operation. This polymer is intended to be completely burned or volatilized from the ceramic surface after the wire has been wound to produce the coil or other electrical component and prior to any potting or encapsulation of such component. Due to the nature of the polymer film, its volatilization leaves no carbonaceous residue on the ceramic insulation, which could cause breakdown of the electrical component because carbon is a good electrical conductor.

Examples of the frit are as follows, all percentages being by weight:

Lead borate (Frit A):  Percent
 PbO _____ 79–84
 $B_2O_3$ _____ 21–16

Lead silico-borate (Frit B):  Percent
 PbO _____ 82–89
 $B_2O_3$ _____ 9–13
 $SiO_2$ _____ 1–5

Low alkali-lead silicate (Frit C):  Percent
 $K_2O$ _____ 0–3
 $Na_2O$ _____ 0–1
 CaO _____ 0–1
 PbO _____ 60–70
 $Al_2O_3$ _____ 0–5
 SiO _____ 24–35

Barium boro-silicate (Frit D):  Percent
 BaO _____ 41–44
 CaO _____ 2.5–5
 ZnO _____ 4–6.5
 $SiO_2$ _____ 39–42
 $B_2O_3$ _____ 5–7.5
 $Al_2O_3$ _____ 1.5–3.5

Lead silicate (Frit E):  Percent
 PbO _____ 82–86
 $SiO_2$ _____ 14–18

Barium-alumino-silico-borate (Frit F):  Percent
 BaO _____ 23–27
 $B_2O_3$ _____ 48–54
 $Al_2O_3$ _____ 4–12
 $SiO_2$ _____ 10–20

Lead-zinc-alumino-silicate (Frit G):  Percent
 $Na_2O$ _____ 0–1.5
 PbO _____ 54–58
 ZnO _____ 19–22
 $Al_2O_3$ _____ 1–2.5
 $SiO_2$ _____ 18–21

In preparing the ceramic batch or slip for wire coating, the frit or frits and the refractory material are blended and ground (preferably to minus 325 mesh particle size in a ball mill) and are then placed in a clay-water suspension such as is known in the art of porcelain enameling. The following are examples of such ceramic batches or slips:

CERAMIC BATCH FORMULAS

*No. 1*

|  | Parts |
|---|---|
| Frit B | 25 |
| Frit C | 15 |
| Frit A | 15 |
| Frit D | 15 |
| Titanium dioxide | 15 |
| Chromium oxide | 15 |
| Enameling clay | 7 |
| Water | 50 |

*No. 2*

|  | Parts |
|---|---|
| Frit G | 90 |
| Chromium oxide | 5 |
| Titanium dioxide | 5 |
| Enameling clay | 7 |
| Water | 50 |

*No. 3*

|  | Parts |
|---|---|
| Frit C | 10 |
| Frit A | 20 |
| Frit D | 15 |
| Frit B | 25 |
| Chromium oxide | 15 |
| Titanium dioxide | 15 |
| Enameling clay | 7 |
| Water | 50 |

*No. 4*

|  | Parts |
|---|---|
| Frit B | 90 |
| Titanium dioxide | 5 |
| Silicon dioxide | 5 |
| Clay | 7 |
| Water | 50 |

*No. 5*

|  | Parts |
|---|---|
| Frit D | 40 |
| Frit B | 40 |
| Chromium oxide | 10 |
| Titanium dioxide | 10 |
| Enameling clay | 7 |
| Water | 50 |

*No. 6*

|  | Parts |
|---|---|
| Frit B | 45 |
| Frit F | 45 |
| Chromium oxide | 5 |
| Titanium dioxide | 5 |
| Enameling clay | 7 |
| Water | 50 |

No. 7

| | Parts |
|---|---|
| Frit F | 50 |
| Frit B | 45 |
| Boron nitride | 5 |
| Enameling clay | 7 |
| Water | 50 |

No. 8

| | Parts |
|---|---|
| Frit D | 35 |
| Frit B | 50 |
| Chromium oxide | 12½ |
| Zirconium dioxide | 2½ |
| Enameling clay | 7 |
| Water | 50 |

No. 9

| | Parts |
|---|---|
| Frit D | 35 |
| Frit B | 50 |
| Chromium oxide | 12½ |
| Titanium dioxide | 2½ |
| Enameling clay | 7 |
| Water | 49 |

No. 10

| | Parts |
|---|---|
| Frit A | 35 |
| Frit B | 35 |
| Titanium dioxide | 15 |
| Chromium oxide | 15 |
| Enameling clay | 7 |
| Water | 50 |

No. 11

| | Parts |
|---|---|
| Frit A | 45 |
| Frit B | 45 |
| Chromium oxide | 5 |
| Titanium dioxide | 5 |
| Enameling clay | 7 |
| Water | 50 |

No. 12

| | Parts |
|---|---|
| Frit A | 40 |
| Frit B | 40 |
| Titanium dioxide | 10 |
| Chromium oxide | 10 |
| Enameling clay | 7 |
| Water | 50 |

No. 13

| | Parts |
|---|---|
| Frit B | 45 |
| Frit D | 45 |
| Chromium oxide | 5 |
| Titanium dioxide | 5 |
| Enameling clay | 7 |
| Water | 50 |

No. 14

| | Parts |
|---|---|
| Frit B | 45 |
| Frit D | 50 |
| Aluminum oxide | 5 |
| Enameling clay | 7 |
| Water | 50 |

No. 15

| | Parts |
|---|---|
| Frit B | 50 |
| Frit D | 35 |
| Thermica* | 5 |
| Chromium oxide | 7½ |
| Zirconium | 2½ |
| Enameling clay | 7 |
| Water | 50 |

*Synthetic mica.

No. 16

| | Parts |
|---|---|
| Frit B | 50 |
| Frit D | 35 |
| Thermica* | 5 |
| Chromium oxide | 7½ |
| Titanium dioxide | 2½ |
| Enameling clay | 7 |
| Water | 50 |

*Synthetic mica.

No. 17

| | Parts |
|---|---|
| Frit B | 45 |
| Frit D | 50 |
| Boron nitride | 5 |
| Enameling clay | 7 |
| Water | 50 |

No. 18

| | Parts |
|---|---|
| Frit B | 50 |
| Frit D | 35 |
| Boron nitride | 5 |
| Chromium oxide | 7½ |
| Titanium dioxide | 2½ |
| Enameling clay | 7 |
| Water | 50 |

No. 19

| | Parts |
|---|---|
| Frit B | 45 |
| Frit D | 22½ |
| Frit E | 22½ |
| Chromium oxide | 5 |
| Titanium dioxide | 5 |
| Enameling clay | 7 |
| Water | 50 |

No. 20

| | Parts |
|---|---|
| Frit B | 45 |
| Frit D | 22½ |
| Frit E | 20 |
| Chromium oxide | 5 |
| Titanium dioxide | 5 |
| Thermica | 2½ |
| Enameling clay | 7 |
| Water | 50 |

No. 21

| | Parts |
|---|---|
| Frit B | 50 |
| Frit D | 35 |
| Chromium oxide | 7½ |
| Aluminum oxide | 5 |
| Zirconium dioxide | 2½ |
| Enameling clay | 7 |
| Water | 50 |

No. 22

| | Parts |
|---|---|
| Frit B | 50 |
| Frit F | 35 |
| Chromium oxide | 12½ |
| Zirconium dioxide | 2½ |
| Enameling clay | 7 |
| Water | 50 |

No. 23

| | Parts |
|---|---|
| Frit B | 45 |
| Frit F | 50 |
| Thermica | 5 |
| Enameling clay | 7 |
| Water | 50 |

No. 24

| | Parts |
|---|---|
| Frit B | 40 |
| Frit F | 40 |
| Chromium oxide | 10 |
| Titanium dioxide | 10 |
| Enameling clay | 7 |
| Water | 50 |

The conductor to be coated may be any oxidation-resistance conductor used for magnet wire, such as nickel-plated copper, nickel-clad copper, stainless steel-clad copper and nickel-clad silver.

In the preferred practice of the invention, the batch material or slip is applied to the conductor in coatings each having a thickness of 0.05 to 0.25 mil. Each coating is applied by passing the conductor through the slip, after which the coated conductor is passed through an oven or heating zone containing an oxidizing atmosphere at a temperature of 1300° F. to 1950° F., the rate of travel through the oven being such that the coating is held at the heating temperature for a period of only 25 to 180 seconds, depending upon the wire gauge and the particular batch formula used (larger diameter of the wire and lower frit content of the ceramic slip require a longer heating period). This causes evaporation of the water and only partial fusion of the coating mixture in that only part of the refractory material dissolves in the melted frit. In other words, the ceramic system is cured to a semi-vitreous state so that upon cooling of the coated conductor passing from the oven, the coating will be characterized by a substantial crystalline phase (undissolved refractory material) dispersed through a glassy phase resulting from the melted frit and refractory material dissolved therein. This procedure is repeated by again passing the wire through the ceramic slip and the oven, to provide multiple coatings of the character described having a total thickness of 0.15 to 0.5 mil.

By way of example, a coating of Batch No. 1 when cured to a semi-vitreous state on the conductor, as above described, will have approximately the following weight percentages of the oxides which make up the final coating: 41.0 of PbO, 6.0 of BaO, 0.1 of $Na_2O$, 0.1 of $K_2O$, 0.6 of CaO, 0.7 of ZnO, 2.0 of $Al_2O_3$, 6.1 of $B_2O_3$, 15.1 of $SiO_2$, 14.1 of $TiO_2$, and 14.1 of $Cr_2O_3$.

The ceramic coated conductor is then preferably passed through a solution of the linear thermoplastic polymer to form an overcoating on the final ceramic coating, and then through an oven at a temperature sufficient only to volatilize the solvent from the polymer, and cure the polymer. This temperature will be substantially lower than the temperature at which the ceramic coatings are partially fused in the first oven, for example, a temperature of 550° F. Thus, the final ceramic coating will be overcoated with a continuous layer of the polymer as a lubricant, this outer layer being preferably of a thickness of 0.05 to 0.25 mil.

An example of a linear thermoplastic polymer coating solution for this outer layer is as follows:

Pour 875 parts of cresylic acid (Pitt-Consol No. 55) into a stainless steel container, heat it to 80–90° C., and add with gentle stirring 125 parts of Dacron No. 54 (du Pont) in small portions. Under these conditions, the polyester will readily disintegrate in the liquid. Then add 10 parts of xylene with stirring, close the container, and apply suction to remove xylene together with any water that may be in the cresylic acid or adhering to the polyester. Check the quantity removed by measuring the condensate or by loss of weight of the batch and make certain that all of the xylene has been withdrawn. Then discontinue the suction, heat the mixture to 110–120° C. in a closed container with gentle stirring, maintain this temperature for 30 minutes, cool to below 60° C., and filter. The solution, now ready for coating, has a viscosity of 195–200 cps. and a solids content of 12.5%, and weighs 8.90 lbs./gal.

The organic outer layer protects the ceramic coatings against excessive abrasion when the magnet wire is used in windings for electrical components. It also acts to prevent undue localizing of the stresses developed in the ceramic coatings when the wire is bent around a very small diameter. After the wire has been wound into the coil or other desired form of electrical component, the protective outer layer of linear polymer may be removed by burning or volatilizing it. The preferred linear polymeric material will completely volatilize at temperatures as low as 700° F., leaving no carbonaceous residue.

Ceramic-coated wire made according to our invention has exceptional flexibility as measured by wrapping it around mandrels from two to six times the wire diameter and examining the coating for cracking and/or spalling under a stereoscope with magnifications to 120×, and also by making a standard NEMA dielectric twist for a film wire (as outlined in NEMA Standard MW-15), and showing a continuity of coating by applying 50 to 100 volts across this twist in a standard manner. Also, using the standard NEMA twist, the following dielectric strengths of the new wire have been measured:

330 volts at 400° C.
300 volts at 500° C.
180 volts at 600° C.

In view of the nature of the ceramic slip, best results can be obtained by maintaining the conductor in a vertical position from the time when the slip is applied to the conductor until the water has been largely evaporated in the oven. Preferably, the ceramic slip or slurry is coated on the wire by an applicator roll of conventional design having a peripheral groove which is continuously supplied with the slip from a reservoir as the roll rotates. The wire is drawn vertically through the groove (and tangentially of the rotating roll) to apply a uniform coating of the slip, and is then drawn vertically into the oven.

In the accompanying drawing, the single illustration is a cross-sectional view, on an enlarged scale, of a magnet wire insulated according to the invention. As there shown, the oxidation-resistance conductor 1 has an insulation covering 2 consisting of two coatings of the semi-vitreous ceramic, and an outer film 3 of the linear thermoplastic polymer.

We claim:

1. Insulated wire comprising an elongated, oxidation-resistant electrical conductor, and multiple separately fired ceramic coatings on the conductor each consisting essentially of substantial proportions of both glassy and crystalline phases which are the product of partial fusion of a mixture of (a) a frit of a compound selected from the group consisting of lead borate, lead silico-borate, lead silicate, barium boro-silicate, barium-alumino-silico-borate and mixtures thereof and (b) a refractory dielectric material, said refractory material being 5 to 30 parts by weight of said mixture of (a) and (b), said glassy phase being formed from the melted frit in which only part of the refractory material is dissolved, said crystalline phase being formed from the remaining undissolved refractory material and being dispersed through said glassy phase.

2. Insulated wire according to claim 1, in which each coating has a thickness of 0.05 to 0.25 mil.

3. Insulated wire according to claim 1, comprising also a layer of a linear thermoplastic polymer coated on the outermost coating and which is volatilizable to form a substantially non-carbonaceous residue.

4. Insulated wire according to claim 1, comprising also a layer of a linear thermoplastic polymer on the outermost coating and which is volatilizable to form a substantially non-carbonaceous residue, said linear polymer being essentially the reaction product of a dihydric alcohol and an aromatic dicarboxylic acid, 5. Insulated wire according to claim 1, comprising also a layer of a linear thermoplastic polymer coated on the outermost coating and which is volatilizable to form a substantially non-carbonaceous residue, said linear polymer being essentially a polyethylene terephthalate polyester.

6. In the manufacture of insulated wire, the method which comprises coating an oxidation-resistant conductive wire by passing the wire through a ceramic slip consisting essentially of a clay and water suspension of a mixture of a refractory dielectric material and a frit of a compound selected from the group consisting of lead borate, lead silico-borate, lead silicate, barium boro-silicate, barium-alumino-silico-borate and mixtures thereof, said frit being present in substantially greater proportion than said refractory material, heating the slip-coated wire in an oxidizing atmosphere to a temperature and for a period of time sufficient only to melt the frit and partially dissolve the refractory material in the melted frit, leaving a substantial portion of undissolved refractory material dispersed as a crystalline phase throughout a glassy phase formed from the melted frit and dissolved refractory material, cooling the coated wire, and repeating said coating and heating steps to provide at least one additional ceramic coating partially fused on the first coating.

7. The method according to claim 6, in which said heating is to a temperature of 1300° F.–1950° F. for a period of 25–180 seconds.

8. The method according to claim 6, in which said coating and heating steps are repeated until the coatings have a total thickness of 0.15 to 0.5 mil.

9. The method according to claim 6, in which said heating step is effected by passing the slip-coated wire continuously through a heating zone, the wire being drawn vertically through the ceramic slip and from said slip to the heating zone.

10. The method according to claim 6, comprising also the steps of passing the wire with the final ceramic coating through a solution of a linear thermoplastic polymer in a solvent, whereby the polymer solution is applied as an over-coating on said final coating, said polymer being volatilizable to form a substantially non-carbonaceous residue, and heating the over-coated wire sufficiently to substantially remove said solvent but insufficiently to volatilize said polymer, thereby forming on said final coating a thin, uniform and continuous layer of the linear thermoplastic polymer as a lubricating film.

11. The method according to claim 10, in which said linear polymer is essentially a polyethylene terephthalate polyester.

References Cited by the Examiner

UNITED STATES PATENTS

| | | | |
|---|---|---|---|
| 2,487,119 | 11/1949 | Fenton | 106—48 |
| 2,851,376 | 9/1958 | Adlassnig | 106—48 X |
| 2,975,078 | 3/1961 | Rayfield | 174—110 |
| 3,028,446 | 4/1962 | Toulmin | 174—110 |
| 3,078,186 | 2/1963 | Tierney | 117—231 X |
| 3,089,787 | 5/1963 | Sattler et al. | 117—231 X |
| 3,109,053 | 10/1963 | Ahearn | 174—110 |
| 3,119,897 | 1/1964 | Coper | 174—110 |

FOREIGN PATENTS

| | | |
|---|---|---|
| 509,264 | 2/1952 | Belgium. |
| 599,097 | 3/1948 | Great Britain. |

ROBERT K. SCHAEFER, *Primary Examiner.*

JOHN P. WILDMAN, LARAMIE E. ASKIN, JOHN F. BURNS, E. JAMES SAX, *Examiners.*

K. R. PETERSON, DONALD A. KETTLESTRINGS,
*Assistant Examiners.*